(12) United States Patent
Kawashima et al.

(10) Patent No.: US 6,715,896 B2
(45) Date of Patent: Apr. 6, 2004

(54) SPREAD ILLUMINATING APPARATUS WITH A DETACHABLE FRAME

(75) Inventors: Satoshi Kawashima, Iwata-gun (JP); Akihisa Nishioka, Iwata-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 10/014,559

(22) Filed: Dec. 14, 2001

(65) Prior Publication Data

US 2002/0075667 A1 Jun. 20, 2002

(30) Foreign Application Priority Data

Dec. 20, 2000 (JP) .......................... 2000-387278

(51) Int. Cl.[7] .................... F21V 15/01; G01D 11/28
(52) U.S. Cl. ........................... 362/31; 362/27
(58) Field of Search ................ 362/26, 31, 27, 362/362; 349/58, 62, 65

(56) References Cited

U.S. PATENT DOCUMENTS 6,454,423 B1 * 9/2002 Suzuki et al. ............... 362/31

2001/0012203 A1 * 8/2001 Suzuki et al. ............... 362/31

* cited by examiner

Primary Examiner—Y. My Quach-Lee
(74) Attorney, Agent, or Firm—Oliff & Berridge, PLC

(57) ABSTRACT

There is provided a spread illuminating apparatus in which its components are reliably fixed and efficiency of light emission is improved. Frame sub-assemblies for covering peripheral portions of upper and lower surfaces of a transparent substrate and upper, lower and end surfaces of light reflection members are provided. The frame sub-assemblies are made of a metal plate and bent to be approximately U-shaped in section and the portions thereof covering the central portion of the transparent substrate, namely, covering the observation surface of the spread illuminating apparatus are cut away. The frame sub-assemblies are configured so as to constitute upper and lower halves, respectively, of a so-called picture frame, and each include a stopper for holding a spot-like light source in a predetermined position with respect to a light conductive member and stoppers for holding the transparent substrate in position with respect to a longitudinal direction of the light conductive member. Openings and projections are provided and engaged with each other to couple the frame sub-assemblies.

12 Claims, 7 Drawing Sheets

SPREAD ILLUMINATING APPARATUS WITH A DETACHABLE FRAME

BACKGROUND OF THE INVENTION

1. Field of the Invention

The present invention relates to a frame unit of a spread illuminating apparatus used as an illuminating means for a reflection-type display.

2. Description of the Related Art

A liquid crystal display featuring low profile, small occupied volume and light weight is used for many electrical products such as mobile phones and personal computers, and the demand thereof has been increased. Since a liquid crystal which is a component of the liquid crystal display does not emit light by itself, an illuminating means for a liquid crystal is separately required besides the liquid crystal display when used in dark places where solar or room light is not satisfactorily available. Thus, this illuminating means is desired to be compact in size and small in power consumption. In recent years, a thin plate-like spread illuminating apparatus of side light type (light conductive member type) is often applied in the liquid crystal display.

FIG. 9 shows an embodiment of a conventional spread illuminating apparatus of side light type.

As shown in the figure, a spread illuminating apparatus 1' is generally composed of a transparent substrate 2 made of a light-transmissible material and a bar-like light source 5 disposed close to an end surface 8 of the transparent substrate 2. Light rays emitted from the light source 5 are introduced into the transparent substrate 2, and then reflected to illuminate a liquid crystal display (not shown) disposed under the transparent substrate 2.

The light source 5 is composed of a bar-like light conductive member 3 made of a transparent material and a spot-like light source (e.g. a light-emitting diode) 4 disposed facing one end of the light conductive member 3. The light conductive member 3 is provided with an optical path conversion means 12. The optical path conversion means 12, which makes light rays emitted from the spot-like light source 4 incident uniformly onto the end surface 8 of the transparent substrate 2, has grooves triangular in section on a surface opposite to a surface 9 facing the end surface 8 of the transparent substrate 2. The light conductive member 3 is disposed with the surface 9 running along the end surface 8 of the transparent substrate 2 at a predetermined distance therefrom.

The thickness of the transparent substrate 2 gradually decreases with the increase in distance from the end surface 8, forming the section of the transparent substrate 2 into a wedge-shape. A light reflection pattern 59 is formed on an upper surface 65 of the transparent substrate 2. The light reflection pattern 59 comprises grooves 57 triangular in section and flat portions 58 adjacent thereto, both formed parallel to the light conductive member 3 with predetermined intervals between each other. The grooves 57 are formed to vary in depth from each other so that light coming from the light conductive member 3 is reflected in a substantially uniform manner at a whole surface of the transparent substrate 2 irrespective of the distance from the light conductive member 3 (the light source 5) thereby uniformly illuminating the liquid crystal display (not shown) provided under the transparent substrate 2. Namely, the depth of the grooves 57 increases gradually in proportion to the increase in distance from the light conductive member 3.

A light reflection member (frame) 13 is provided so as to cover the light conductive member 3 for efficiently guiding light rays emitted from the spot-like light source 4 into the transparent substrate 2, protecting the light conductive member 3 against damages due to contact with other components, and preventing the light conductive member 3 from getting dust. The frame 13 is formed by bending in an approximately U-shape and is attached in such a manner as to cover longitudinal peripheral surfaces of the light conductive member 3 except the surface 9 facing the transparent substrate 2. Further, upper and lower opposing plates 13e, 13f of the frame 13 are inclined inwardly so as to have a predetermined angle from a direction perpendicular to a base plate 13g of the frame 13. When the frame 13 is set, the frame 13 is disposed in such a manner that distal ends of the upper and lower opposing plates 13e, 13f (ends opposite to ends continuous with the base plate 13g) cover the ends of the upper and lower surfaces 65, 66, respectively. Since the upper and lower opposing plates 13e, 13f are inclined inwardly giving an elastic force, the frame 13 is adapted to clamp the transparent substrate 2 and thereby fixed thereto. The frame 13 is structured such that a hard resin product has on the inner surface thereof a film on which a metal such as silver is evaporated or a white film or that a metal plate of aluminum or stainless is bent.

The frame 13 may be fixed to the transparent substrate 2 by placing a double-faced adhesive tape 54 on either of their overlapping portions, for instance, at the ends of the upper and lower surfaces 65, 66 of the transparent substrate 2.

However, the above conventional art has the following problems.

In the method of fixing the frame to the substrate by means of its elastic force, since fixing force between components (transparent substrate, light conductive member, and spot-like light source) is weak resulting in the components getting easily out of position, a stable illumination effect may not be achieved. Further, since the weak fixing force makes it difficult to connect or assemble the frame with other components (e.g. a liquid crystal display and so on), and since the assembly work must be carried out carefully so that the frame does not contact with the transparent substrate or the light conductive member, the working efficiency deteriorates.

In the method using an adhesive tape, the overall thickness of the apparatus increases for the thickness of the adhesive tape, and an irregularity in surface exists at the edges the adhesive tape.

Moreover, the frame covers only the light conductive member and does not protect the spread illuminating apparatus entirely.

SUMMARY OF THE INVENTION

The present invention has been made in light of the above problems and the object of the present invention is to provide a spread illuminating apparatus which includes a frame unit capable of securely fixing its components thereby achieving a stable illumination effect.

In order to solve the problems, according to a first aspect of the present invention, in a spread illuminating apparatus comprising: a spread illuminating section in which a bar-like light source composed of a light conductive member and a spot-like light source disposed at an end of the light conductive member is provided close to and along one end surface or each of two end surfaces of a transparent substrate made of a light-transmissible material; and a frame unit, the frame unit covers peripheral portions of upper and lower surfaces of the spread illuminating section and surfaces of both ends of the spread illuminating section, at least one of which the bar-like light source constitutes. Here, the spread illuminating section means a part of a spread illuminating apparatus and is composed of a transparent substrate and at least one light source disposed on an end surface thereof (and a light reflection member if provided).

According to a second aspect of the present invention, in the spread illuminating apparatus described in the first aspect, the frame unit is composed of two frame sub-assemblies, which are fitted onto the spread illuminating section from respective ends of the spread illuminating section, and are coupled to each other. With this construction, the entire periphery of the spread illuminating section can be covered with the frame unit and thus the components constituting the spread illuminating section can be fixed reliably.

According to a third aspect of the present invention, in the spread illuminating apparatus described in the first or second aspect, openings may be formed in one frame sub-assembly and projections are formed in the other frame sub-assembly at respective portions overlapping each other, and the openings and the projections may be engaged with each other to couple the two frame sub-assemblies. With this construction, the coupling process can be facilitated and the respective components can be fixed with precision.

According to a fourth aspect of the present invention, in the spread illuminating apparatus described in the third aspect, the two frame sub-assemblies may be fitted detachably. With this construction, the frame sub-assemblies can be fitted or detached easily and thus the efficiency in possible rework during the assembly can be improved.

According to a fifth aspect of the present invention, in the spread illuminating apparatus described in any one of the first to fourth aspects, an end of the light source may be fixed to a stopper extending from the frame sub-assembly. With this construction, since the stopper can fix the spot-like light source in a predetermined position with respect to the light conductive member, light emitted from the spot-like light source can be guided efficiently into the light conductive member.

According to a sixth aspect of the present invention, in the spread illuminating apparatus described in any one of the first to fifth aspects, side surfaces of the spread illuminating section, which are not covered with the frame sub-assemblies, may be fixed to stoppers extending from the respective frame sub-assemblies. With this construction, since the stoppers extending from the frame sub-assemblies can fix the transparent substrate constituting the spread illuminating section in a predetermined position with respect to the light conductive member, light emitted from the light source (the light conductive member) can be guided efficiently into the transparent substrate.

According to a seventh aspect of the present invention, in the spread illuminating apparatus described in any one of first to sixth aspects, an FPC, on which chip components including the spot-like light source are mounted, may be housed in the frame sub-assemblies.

According to an eighth aspect of the present invention, in the spread illuminating apparatus described in any one of first to seventh aspects, the side surfaces of the spread illuminating section, which are not covered with the frame sub-assemblies, may be covered with additional frame members.

According to a ninth aspect of the present invention, in the spread illuminating apparatus described in the eighth aspect, the additional frame members may be made of a non-conductive material.

According to a tenth aspect of the present invention, in the spread illuminating apparatus described in the eighth or ninth aspect, a dust-proof structure may be provided on the peripheral portion of the upper surface of the spread illuminating section.

According to an eleventh aspect of the present invention, in the spread illuminating apparatus described in any one of the eighth to tenth aspects, a sealing member may be stuck to the frame sub-assemblies covering the peripheral portion of the upper surface of the spread illuminating section and a transparent film for covering the entire upper surface of the transparent substrate is attached to the sealing member. With this construction, the film for covering the entire upper surface of the transparent substrate can be fitted easily and the spread illuminating apparatus can be provided with an airtight structure, thereby improving the dust-proof effect.

DETAILED DESCRIPTION OF THE PREFERRED EMBODIMENTS

A spread illuminating apparatus according to the embodiments of the present invention will be described with reference to the attached drawings. The spread illuminating apparatus is provided with a frame unit covering the entire periphery of a conventional spread illuminating apparatus. Note that parts and components identical with those of the conventional spread illuminating apparatus are denoted by the same reference symbols and the description thereof is appropriately omitted.

Figure 1:
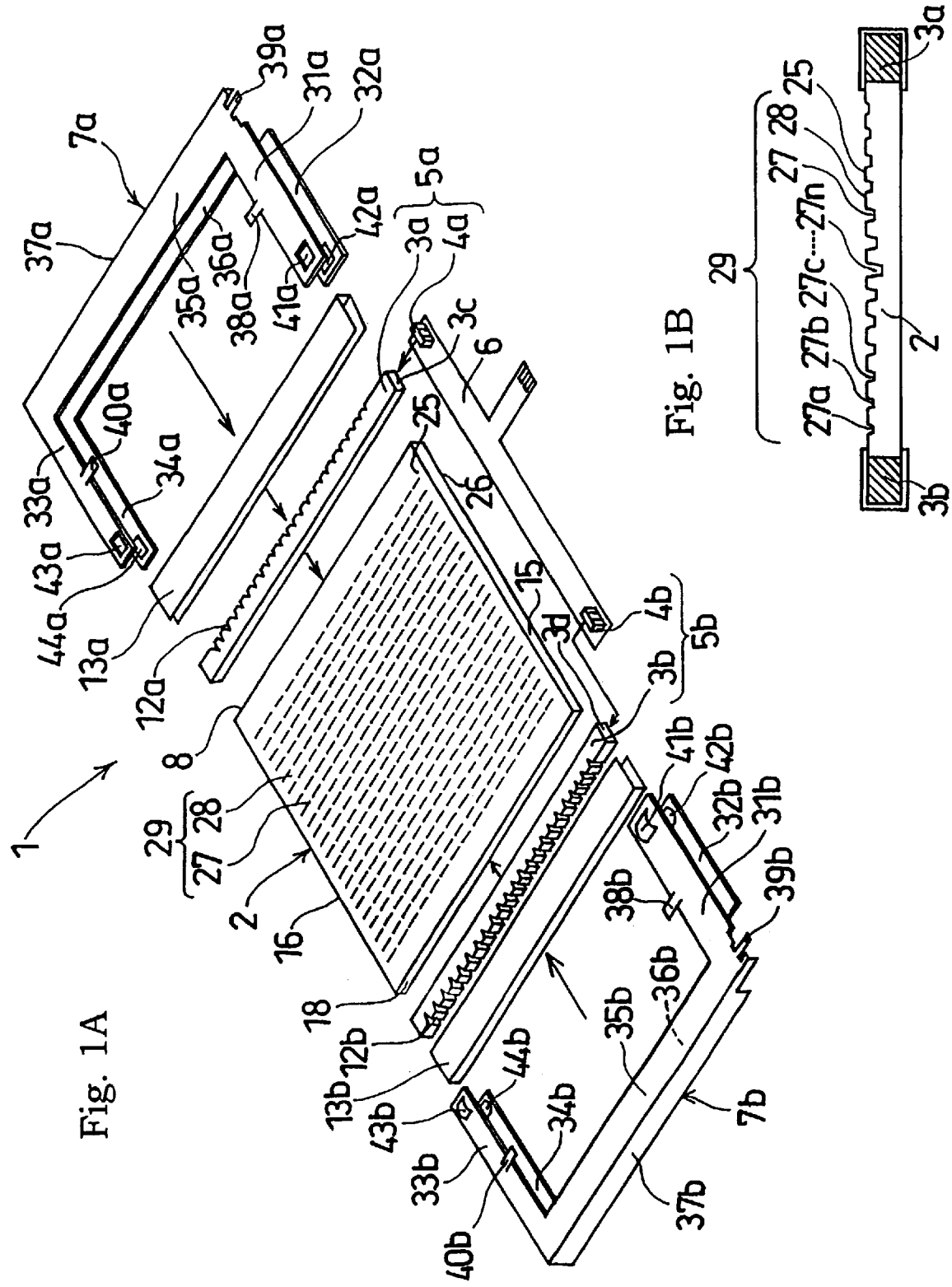
FIG. 1A is an exploded perspective view showing a spread illuminating apparatus according to an embodiment of the present invention.
FIG. 1B shows a light reflection pattern in the spread illuminating apparatus.

FIG. 1A is an exploded perspective view of a spread illuminating apparatus according to an embodiment of the present invention. As shown in the figure, a spread illuminating apparatus 1 is generally composed of a transparent substrate 2, light sources 5a, 5b disposed along end surfaces 8, 18, respectively, of the transparent substrate 2, an FPC (flexible printed circuit board) 6 on which spot-like light sources 4a, 4b constituting the light sources 5a, 5b are mounted, light reflection members (light source frames) 13a, 13b, and two frame sub-assemblies 7a, 7b covering a spread illuminating section comprising the foregoing components.

A light reflection pattern 29 is formed on an upper surface (observation surface) 25 of the transparent substrate 2 so as to uniformly emit light rays made incident on the end surfaces 8, 18 (hereinafter also referred to as incident surfaces) from an entire lower surface 26 of the transparent substrate 2 toward a liquid crystal display (not shown). The light reflection pattern 29 has grooves 27 and flat portions 28 adjacent thereto and is formed parallel to light conductive members 3a, 3b. The grooves 27 are substantially inverse-trapezoidal in section. Namely, the short side of the trapezoid constitutes a bottom of the groove (toward the lower surface 26) and the long side of the trapezoid constitutes an open top of the groove (toward the upper surface 25). The depth of the grooves 27 increases in proportion to the increase in distance from the light conductive members 3a, 3b. The depth of each groove 27 differs from the depth of adjacent ones. The grooves 27 close to the light conductive members 3a, 3b have small depth, whereas the grooves 27 distant from the light conductive members 3a, 3b have large depth. And, the depth of the groove 27 is largest at the center of the transparent substrate 2.

FIG. 1B is a general side view of the light reflection pattern 29 formed on the upper surface 25 of the transparent substrate 2. FIG. 1B shows grooves 27a, 27b, . . . , 27n. The groove 27a closest to the light conductive member 3b has a smallest depth. The depth of the grooves (the grooves 27b, 27c, . . . ) increases in proportion to the increase in distance from the light conductive member 3b. The groove 27n positioned approximately at the center of the transparent substrate 2 has a largest depth. By thus changing the depth of the grooves 27 according to the distance from the light conductive members 3a, 3b, uniform emittance of light from the transparent substrate 2 can be achieved.

The light sources 5a, 5b are composed of the bar-like light conductive members 3a, 3b and the spot-like light sources 4a, 4b, respectively. Optical path conversion means 12a, 12b are formed on one surface of the light conductive members 3a, 3b, respectively. The spot-like light source 4a is disposed close to one end of the light conductive member 3a so as to face an end surface 3c of the light conductive member 3a. The spot-like light source 4b is disposed close to one end of the light conductive member 3b so as to face an end surface 3d of the light conductive member 3b. The spot-like light sources 4a, 4b are soldered to the FPC. The light reflection members 13a, 13b are disposed so as to cover the light conductive members 3a, 3b, respectively, and further the ends of the upper surface 25 and the lower surface 26 of the transparent substrate 2 when the spread illuminating apparatus 1 is assembled.

The frame sub-assemblies 7a, 7b are made of a metal plate and formed by bending to be approximately U-shaped in section, and portions covering an observation surface in the spread illuminating apparatus 1 assembled are cut off, whereby the frame sub-assemblies 7a, 7b are configured so as to constitute upper and lower halves of a so-called picture frame. Specifically, the frame sub-assembly 7a is composed of an upper frame portion 31a and a lower frame portion 32a, an upper frame portion 33a and a lower frame portion 34a, an upper frame portion 35a and a lower frame portion 36a, and an end frame portion 37a. The upper frame portion 31a and the lower frame portion 32a cover almost halves of the peripheral portions of the upper surface 25 and the lower surface 26, respectively, toward a side surface 15 of the transparent substrate 2 and almost half of the FPC 6. The upper frame portion 33a and the lower frame portion 34a cover almost halves of the peripheral portions of the upper surface 25 and the lower surface 26, respectively, toward a side surface 16. The upper frame portion 35a and the lower frame portion 36a cover the light reflection member 13a (including the light conductive member 3a) and the peripheral portions of the upper surface 25 and the lower surface 26, respectively, toward the end surface 8 of the transparent substrate 2. The end frame portion 37a covers the end face of the light reflection member 13a.

The upper frame portions 31a, 33a have stoppers 38a, 40a for preventing the transparent substrate 2 from shifting toward the side surfaces 15, 16, respectively. When assembling the spread illuminating apparatus 1, the stoppers 38a, 40a are bent substantially vertically toward the lower frame portions 32a, 34a, respectively. Furthermore, a stopper 39a, which prevents the spot-like light source 4a from shifting with respect to the light conductive member 3a, is provided at an end of the upper frame portion 35a. Openings 41a, 42a, 43a and 44a, into which after-mentioned projections of the frame sub-assembly 7b are fitted, are provided at distal ends of the upper and lower frame portions 31a, 32a and the upper and lower frame portions 33a, 34a, respectively.

Similarly, the frame sub-assembly 7b is composed of an upper frame portion 31b and a lower frame portion 32b, an upper frame portion 33b and a lower frame portion 34b, an upper frame portion 35b and a lower frame portion 36b, and an end frame portion 37b. The upper frame portion 31b and the lower frame portion 32b cover almost halves of the peripheral portions of the upper and lower surfaces 25, 26, respectively, toward the side surface 15 and almost half of the FPC 6. The upper frame portion 33b and the lower frame portion 34b cover almost halves of the peripheral portions of the upper and lower surfaces 25, 26, respectively, toward the side surface 16. The upper frame portion 35b and the lower frame portion 36b cover the light reflection member 13b (including the light conductive member 3b) and the peripheral portions of the upper and lower surfaces 25, 26, respectively, toward the end surface 18. The end frame portion 37b covers the end face of the light reflection member 13b. The upper frame portion 31b, 33b have stoppers 38b, 40b for preventing the transparent substrate 2 from shifting toward the side surfaces 15, 16, respectively. When assembling the spread illuminating apparatus 1, the stoppers 38b, 40b are bent substantially vertically toward the lower frame portions 32b, 34b, respectively. Furthermore, a stopper 39b, which prevents the spot-like light source 4b from shifting with respect to the light conductive member 3b, is provided at an end of the upper frame portion 35b.

Projections 41b, 42b, 43b and 44b, which are fitted into the openings 41a to 44a of the frame 7a, are provided at distal ends of the upper and lower frame portions 31b, 32b and the upper and lower frame portions 33b, 34b, respectively. When the spread illuminating section is put together with the frame sub-assemblies 7a, 7b, the distal ends of the upper and lower frame portions 31a to 34a of the frame sub-assembly 7a, which are provided with the openings 41a to 44a, respectively, are superimposed on the distal ends of the upper and lower frame portions 31b to 34b of the frame 7b, which are provided with the projections 41b to 44b, respectively, then the projections 41b to 44b fit into the openings 41a to 44a, respectively. Thus, the spread illuminating section is held within the frame sub-assemblies 7a, 7b.

Figure 2:
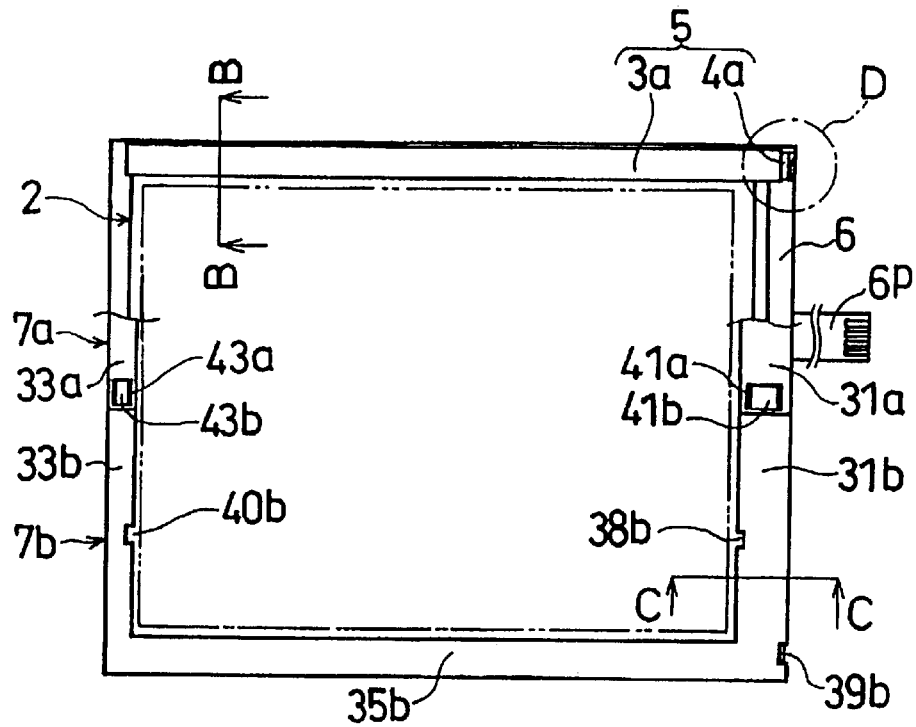
FIG. 2 is a partially cutaway view of the spread illuminating apparatus according to the present invention.

FIG. 2 is a partially cutaway view of the spread illuminating apparatus 1 complete with the frame sub-assemblies 7a, 7b. The transparent substrate 2 is fixed to the bent stoppers 38b, 40b, 38a and 40a (see FIG. 1). That is, the side surfaces 15, 16 of the transparent substrate 2 are held to the inner surfaces of the bent stoppers 38a, 38b, 40a and 40b.

All the components of the spread illuminating section are enclosed with the frame sub-assemblies 7a, 7b (except a connector 6p of the FPC to be connected to another member) when viewed from the upper surface (observation surface) side.

Figure 3:
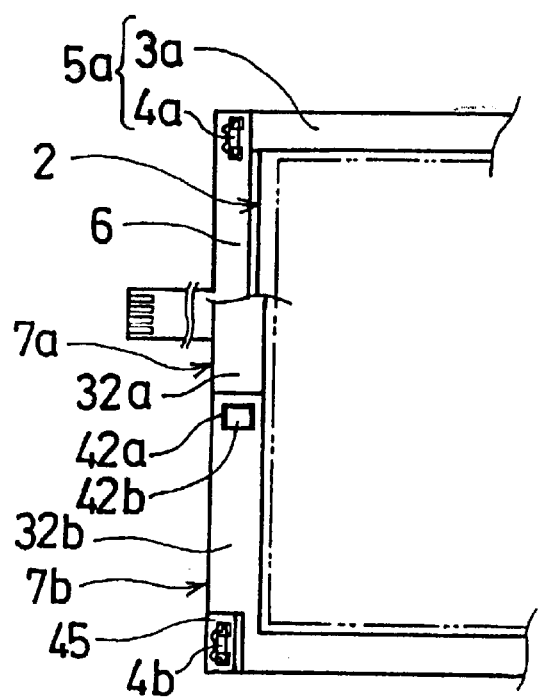
FIG. 3 is a partial bottom view of FIG. 2.

FIG. 3 is a bottom view of the right-side portion (including the upper frame portions 31a, 31b) of FIG. 2.

A cutaway 45 is formed in the lower frame portion 32b of the frame sub-assembly 7b at a portion where the spot-like light source 4b is positioned. The cutaway 45 is dimensioned so that the lower frame portion 32b gets clear of an area subject to soldering (so as not to contact with solder) when the spot-like light source 4b is soldered to the FPC. A cutaway (not shown) identical with the cutaway 45 is formed in the lower frame portion 32a of the frame sub-assembly 7a at a portion where the spot-like light source 4a is positioned.

Figure 4:
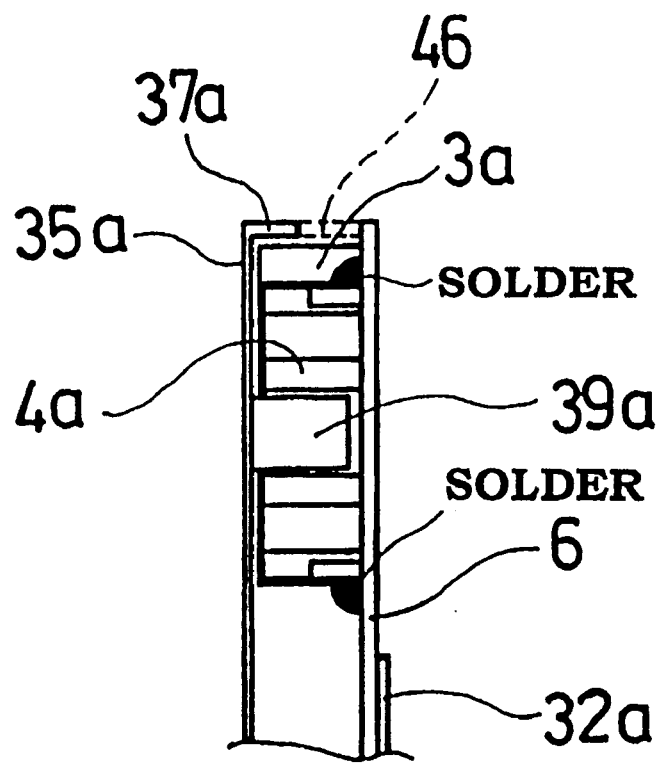
FIG. 4 is an enlarged side view of a region marked with D in FIG. 2.

FIG. 4 is an enlarged side view of a portion marked with D in FIG. 2.

The bent stopper 39a extending from the upper frame portion 35a presses fixedly against the spot-like light source 4a mounted on the FPC 6 substantially at the central portion. In this embodiment, the spot-like light source 4a has a recess at the central portion. The stopper 39a fits into the recess thereby fixing the spot-like light source 4a. Since the stopper 39a fits into the recess, a positional error of the spot-like light source 4a on the FPC 6 can be automatically adjusted thereby fixedly putting the spot-like light source 4a in a predetermined position with respect to the light conductive member 3a.

A cutaway 46 (indicated by a dotted line) is formed also in the end frame portion 37a at a portion where the spot-like light source 4a is positioned so that the end frame portion 37a does not contact with solder applied to the spot-like light source 4a mounted on the FPC 6.

Figure 10:
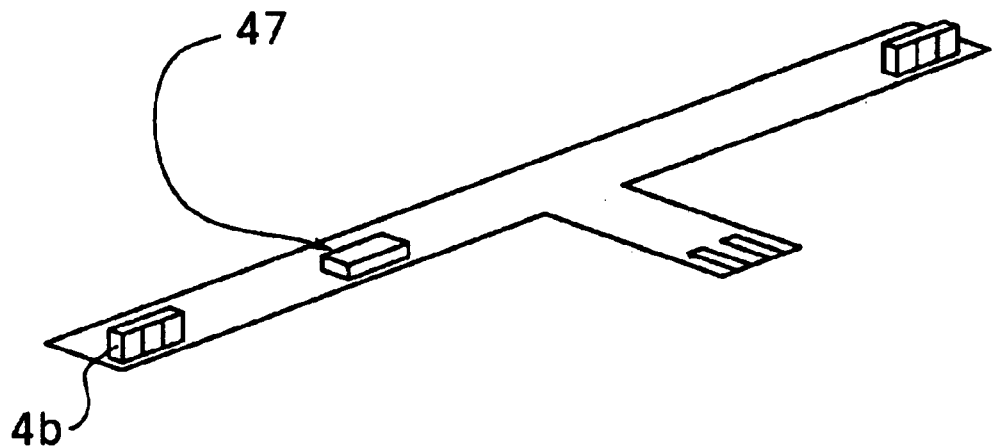
FIG. 10 is an exploded perspective view showing an FPC on which chip components including spot-like light sources are mounted.
Figure 11:
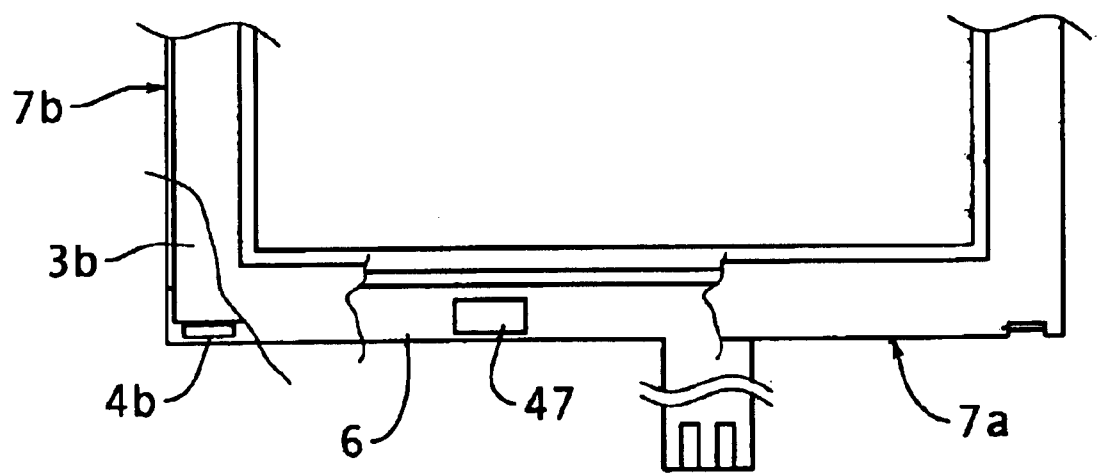
FIG. 11 is a top view of the FPC of FIG. 10.

The spot-like light sources 4a, 4b, and also a plurality of chip components 47 for operation thereof are mounted on the FPC 6 (see also FIGS. 10 and 11). Thus, the FPC 6, on which chip components including the chip components 47 and the spot-like light sources 4a, 4b are mounted, may be housed in the frame sub-assemblies 7a, 7b.

Figure 5:
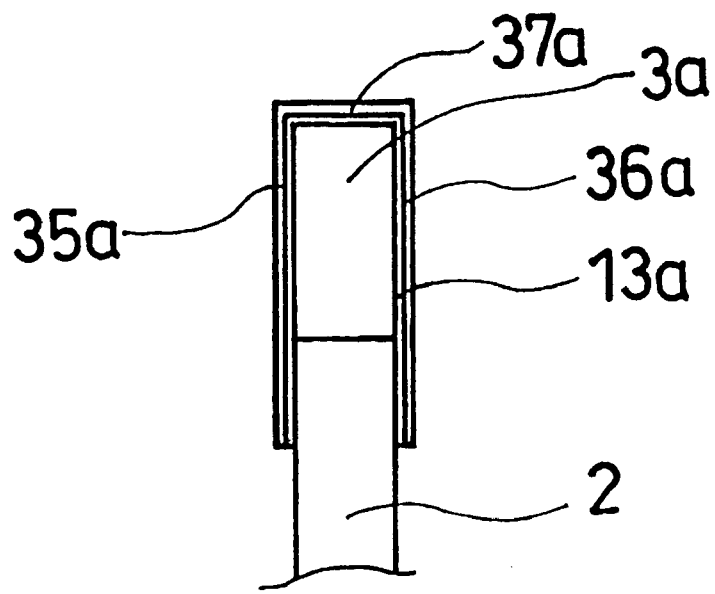
FIG. 5 is a sectional view taken along a line B—B shown in FIG. 2.

FIG. 5 is a sectional view taken along a line B—B shown in FIG. 2.

The light reflection member 13a covering the light conductive member 3a is tightly held to the upper and lower frame portions 35a, 36a and the end frame portion 37a of the frame sub-assembly 7a. Therefore, the light reflection member 13a and the light conductive member 3a are prevented from shifting and light can be efficiently introduced from the light conductive member 3a into the transparent substrate 2.

Figure 6:
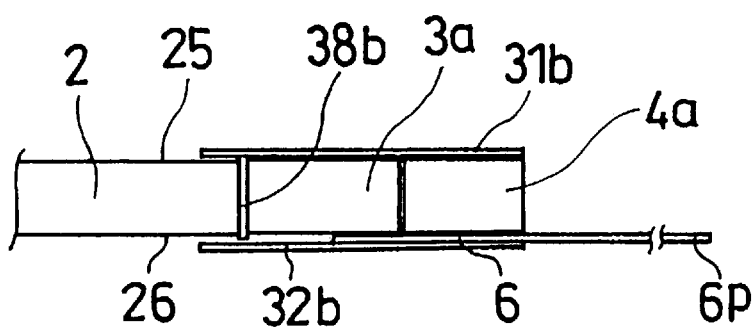
FIG. 6 is a sectional view taken along a line C—C shown in FIG. 2.

FIG. 6 is a sectional view taken along a line C—C shown in FIG. 2.

The side (the side surface 15) of the transparent substrate 2 is fixed to the stopper 38b extending from the upper frame portion 31b. Thus, the transparent substrate 2 can be prevented from shifting in the longitudinal direction of the light conductive member 3a. One side of the upper frame portion 31b (side located to the left of the stopper 38b) covers the upper surface 25 of the transparent substrate 2. One side of the lower frame portion 32b (side located to the left of the stopper 38b) covers the lower surface 26 of the transparent substrate 2. The other sides of the upper and lower frame portions 31b, 32b (sides located right in the figure) extend in such a manner as to cover the FPC 6 (except the connecting portion 6p of the FPC) disposed along and close to the side surface 15 of the transparent substrate 2. Thus, the FPC and the spot-like light sources mounted on the FPC can be prevented from contacting with other components.

Figure 7:
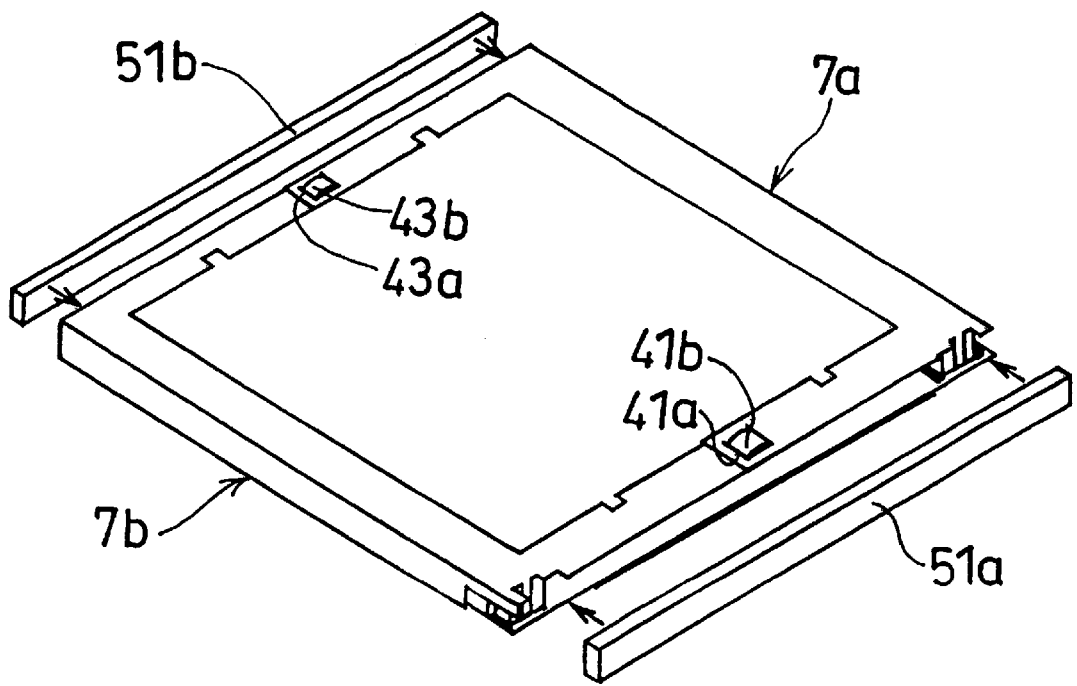
FIG. 7 shows an embodiment in which the apparatus is fitted with additional frame members.

FIG. 7 shows an embodiment in which the spread illuminating section is fitted with additional frame members besides the frame sub-assemblies 7a, 7b.

The frame sub-assemblies 7a, 7b fitted on the spread illuminating section are made of a metal plate and formed by bending to be approximately U-shaped so as to cover the peripheral portions of the upper and lower surfaces of the spread illuminating section and the surfaces of the ends thereof which the light sources constitute. Accordingly, the surfaces of the sides of the spread illuminating section, where the light sources are not provided, are simply fixed to the bent stoppers, and there are no frame members for entirely covering these side surfaces. Here, additional frame members (sealing members) 51a, 51b for entirely covering the side surfaces are provided. The sealing members are oblong plates 51a, 51b made of a non-conductive material such as polyurethane, which is excellent in resilience and wear resistance, and fit into respective open areas formed with the frame sub-assemblies 7a, 7b. This supplements and further enhances the dust-proof effect by the frame sub-assemblies 7a, 7b. Because the non-conductive material is applied, safety against the spot-like light sources mounted by means of soldering on the FPC can be also ensured.

Figure 8:
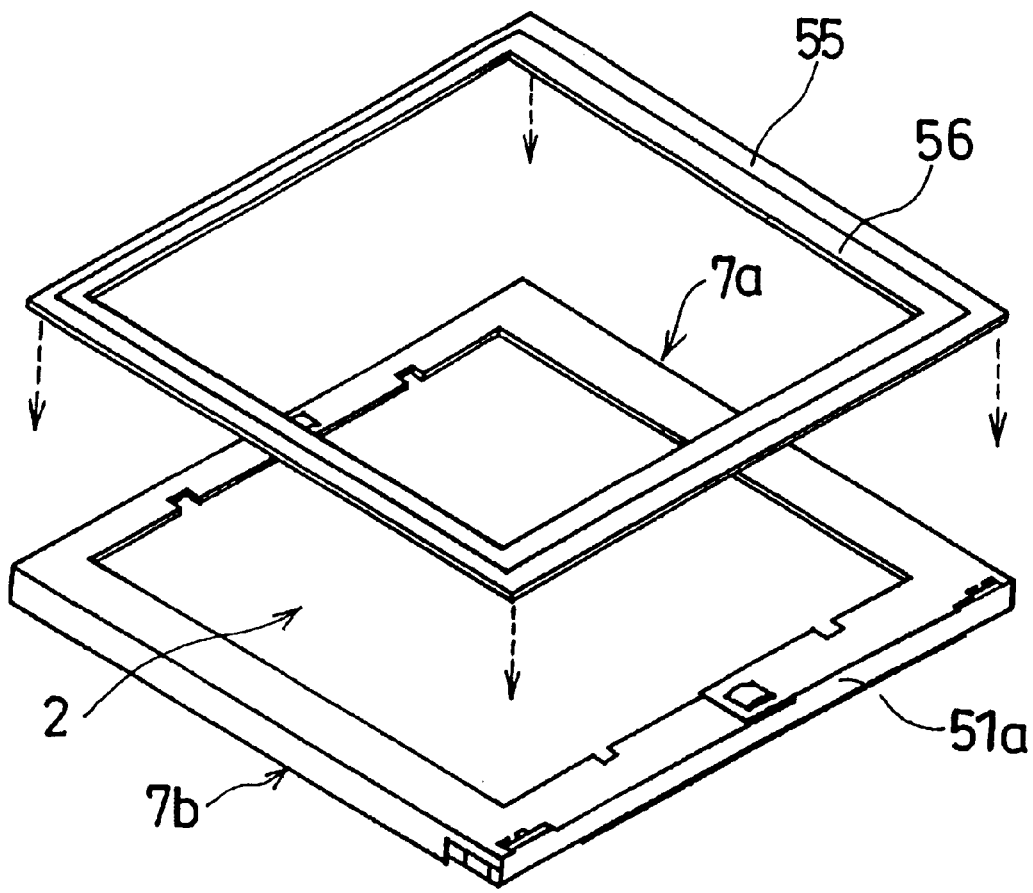
FIG. 8 shows a means for providing frame sub-assemblies with an airtight structure according to an embodiment of the present invention.
Figure 9:
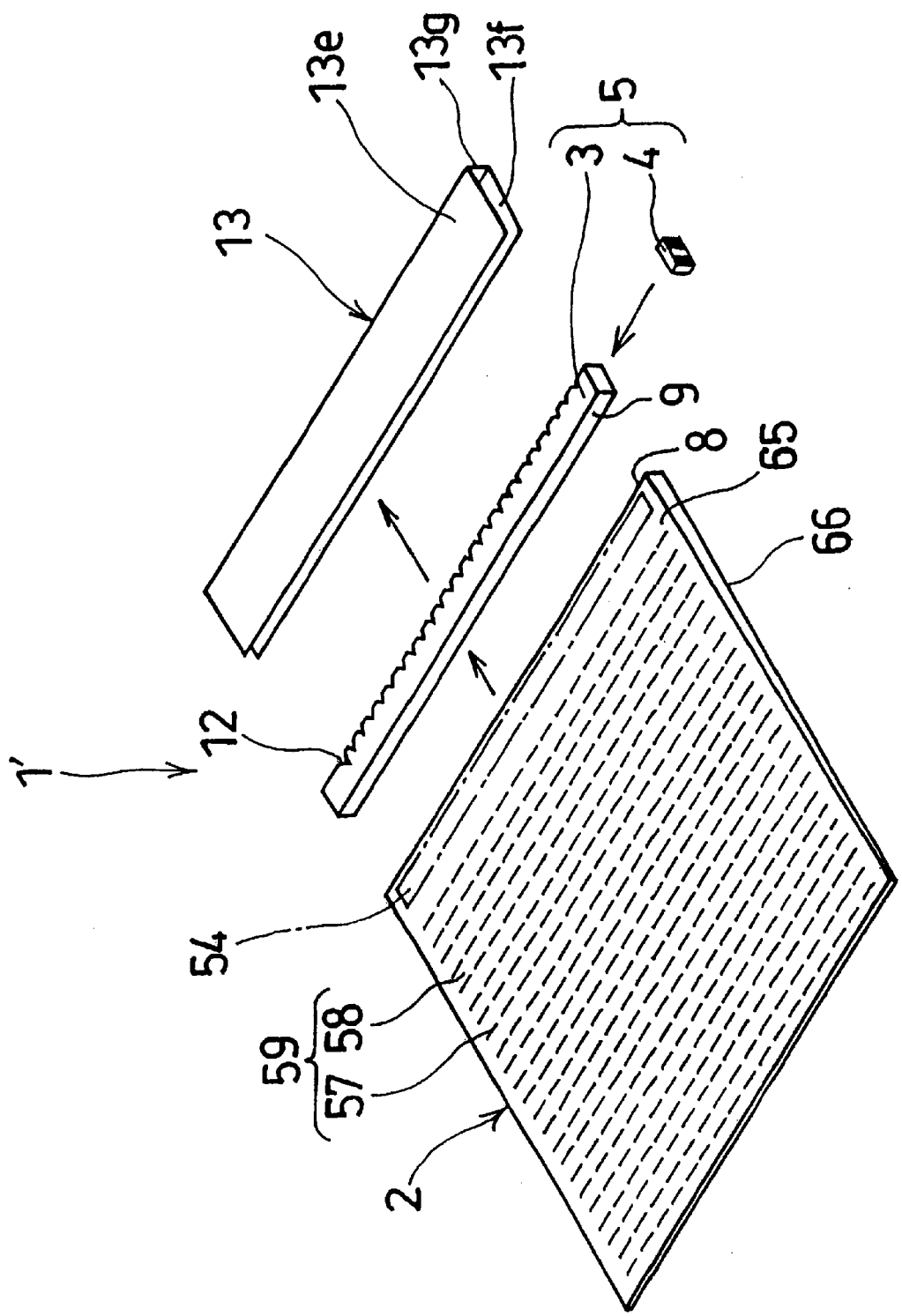
FIG. 9 is an exploded perspective view of a conventional spread illuminating apparatus.

FIG. 8 shows an embodiment of a means for making airtight the frame sub-assemblies fitted on the spread illuminating section.

The upper surfaces (observation side) of the frame sub-assemblies 7a, 7b fitted on the spread illuminating section are generally flat and therefore can be easily connected or assembled with other components. Then, a sealing member 55 (e.g. a square frame-like sealing member) is placed on the frame sub-assemblies covering the peripheral portion of the upper surface of the spread illuminating section, and a transparent film 56 for covering the entire upper surface of the transparent substrate 2 is fitted on the sealing member 55. The sealing member 55 having the transparent film 56 fitted on is fixed to the upper surfaces of the frame sub-assemblies 7a, 7b by using a double-faced adhesive tape or the like. Therefore, the spread illuminating apparatus 1 can be made substantially airtight and the dust-proof effect can be improved considerably.

In the above-described embodiments, the light sources 5a, 5b are provided on the respective end surfaces of the transparent substrate 2. However, the present invention is not limited thereto. For instance, even whether a light source is disposed only on one end surface of the transparent substrate 2 or whether a plurality of light sources are disposed on each of both end surfaces of the transparent substrate 2, a similar effect can be achieved by appropriately adjusting each length of the frame sub-assemblies to match the size of the spread illuminating section.

In the spread illuminating apparatus of the present invention, the two frame sub-assemblies cover the entire periphery of the spread illuminating section, thereby reliably fixing the components constituting the spread illuminating section. Further, the openings and the projections formed on the respective frame sub-assemblies are engaged with each other so as to couple the frame sub-assemblies, so the binding force among the components can be increased. The increased biding force can eliminate the possibility of accidental disengagement of the frame sub-assemblies, and facilitates the handling of the spread illuminating apparatus during assembly, thereby improving the working efficiency.

Further, the openings and the projections, which are once engaged with each other for coupling the two frame sub-assemblies, can be disengaged. Thus, the frame sub-assemblies can be removed from the spread illuminating section easily, whereby reworking efficiency can be improved.

Further, since the spot-like light sources are fixed by means of the stoppers extending from the frame sub-assemblies, spot-like light sources which are mounted on the FPC slightly off a predetermined position can be relocated at the predetermined position with respect to the light conductive members, whereby light rays emitted from the spot-like light sources can be efficiently introduced into the light conductive members thereby enhancing the luminance in the spread illuminating apparatus.

Further, since the transparent substrate is fixed by means of the stoppers extending from the frame sub-assemblies and thus can be held in a predetermined position with respect to the light conductive members, light rays emitted from the light conductive members can efficiently enter the transparent substrate thereby enhancing the luminance in the spread illuminating apparatus.

The additional frame members are provided so as to cover the side surfaces of the spread illuminating section, which are not covered with the frame sub-assemblies, and the transparent film is fitted so as to cover the entire upper surface of the transparent substrate, whereby the spread illuminating apparatus can be made airtight. Thus, the dust-proof effect can be improved, whereby the light conductive members and the transparent substrate can be protected from damages and at the same time the efficiency in emitting from the light conductive members as well as from the transparent substrate is improved thereby enhancing the luminance in the spread illuminating apparatus.

What is claimed is:

1. A spread illuminating apparatus comprising:
   a spread illuminating section including:
     a transparent substrate which is made of a light-transmissible material;
     a bar-like light source composed of a light conductive member; and
     a spot-like light source disposed at an end of the light conductive member which is disposed close to and along at least one end surface of the transparent substrate; and a frame unit;
   wherein the frame unit covers peripheral portions of upper and lower surfaces of the spread illuminating section and end surfaces of the spread illuminating section.

2. The spread illuminating apparatus according to claim 1, wherein the frame unit is composed of two frame sub-assemblies, and the two frame sub-assemblies are fitted onto the spread illuminating section respectively from ends of the spread illuminating section and are coupled to each other.

3. The spread illuminating apparatus according to claim 1, wherein openings and projections are formed in one frame sub-assembly and the other frame sub-assembly, respectively, at areas covering the upper and lower surfaces of the spread illuminating section, and are engaged with each other to couple the two frame sub-assemblies.

4. The spread illuminating apparatus according to claim 3, wherein the two frame sub-assemblies are removably fitted.

5. The spread illuminating apparatus according to claim 1, wherein the spot-like light source is fixedly attached to the end of the light conductive member by a stopper extending from a frame sub-assembly of the frame unit.

6. The spread illuminating apparatus according to claim 1, wherein side surfaces of the spread illuminating section, which are not covered with sub-assemblies of the frame unit, are fixed to stoppers extending from the respective frame sub-assemblies.

7. The spread illuminating apparatus according to claim 1, wherein an FPC, on which chip components including the spot-like light source are mounted, is housed in frame sub-assemblies of the frame unit.

8. The spread illuminating apparatus according to claim 1, wherein additional frame members are provided so as to cover side surfaces of the spread illuminating section, which are not covered with frame sub-assemblies of the frame unit.

9. The spread illuminating apparatus according to claim 8, wherein the additional frame members are made of a non-conductive material.

10. The spread illuminating apparatus according to claim 8, wherein a dust-proof structure is provided on the peripheral portion of the upper surface of the spread illuminating section.

11. The spread illuminating apparatus according to claim 8, wherein sealing members are stuck to frame sub-assemblies covering the peripheral portion of the upper surface of the spread illuminating section and fitted with a transparent film for covering the entire upper surface of the transparent substrate.

12. The spread illuminating apparatus according to claim 1, wherein the end surfaces of the spread illuminating section are parallel to a longitudinal direction of the light conductive member.

* * * * *